3,360,515
7-(CONDENSED N-CONTAINING HETEROCYCLIC CARBONAMIDO) CEPHALOSPORANIC ACID AND DERIVATIVES THEREOF

Tadayoshi Takano, Hirakata, Kiyoshi Hattori, Ibaragi, and Teiji Kishimoto, Kyoto, Japan, assignors to Fujisawa Pharmaceutical Co., Ltd., Osaka, Japan, a Japanese company
No Drawing. Filed July 20, 1965, Ser. No. 473,482
Claims priority, application Japan, July 24, 1964, 39/42,267
7 Claims. (Cl. 260—243)

This invention relates to 7-(condensed N-containing heterocyclic carbonamido) cephalosporanic acid and derivatives thereof, which compounds are useful as antimicrobial agents.

The compounds of this invention may be represented by the following general formula (I):

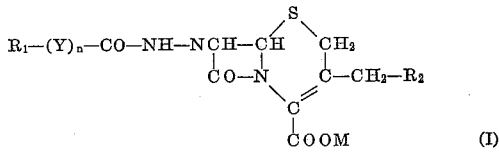

(I)

wherein $R_1$ is a benzene-condensed N-containing heterocyclic radical which is substituted or unsubstituted with halogen atom, nitro, lower alkyl, lower alkoxy or haloaryl radical; $n$ is an integer from 0 to 1; Y is lower alkylene which may contain sulfur atom in its chain; $R_2$ is acetoxy, pyridinium, azido or guanidium group; M is hydrogen atom, a pharmaceutically acceptable non-toxic cation or an anionic charge.

As used herein the term "benzene-condensed N-containing heterocyclic radical" is intended to mean groups containing one to three nitrogen atoms, and it includes indolyl, isoindolyl, 1H-indazolyl, benzimidazolyl, 1H-benzotriazolyl, 2H-benzotriazolyl, quinolyl, 1,2-dihydro-1-oxoisoquinolyl, isoquinolyl, quinoxalinyl, quinazolinyl or cinnolinyl, each of which is substituted or unsubstituted with halogen atom, nitro, lower alkyl, lower alkoxy or haloaryl radical.

In the above Formula I, when M is a pharmaceutically acceptable non-toxic cation it includes, for example, an alkali metal ion such as the sodium or potassium ion, the ammonium ion and an organic quaternary ammonium cation such as triethylammonium, dicyclohexylammonium, diphenylenediammonium or dibenzylethylenediammonium.

The compound of Formula I of this invention may be prepared by reacting 7-aminocephalosporanic acid or a derivative thereof having the general Formula II:

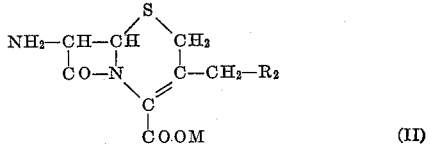

(II)

with a condensed N-containing heterocyclic carboxylic acid having the general Formula III:

$$R_1—(Y)_n—COOH \quad (III)$$

or a reactive derivative thereof, wherein $R_1$, $R_2$, Y, M and $n$ have the same meanings as defined for formula I.

Examples of the carboxylic acid of the above Formula III are, in concrete, 2-methylindole-3-(methylthioacetic acid), 2-methyl indole-3-acetic acid, indole-3-acetic acid, indole-3- (methylthioacetic acid), 1H-indazole-3-carboxylic acid, 1H-indazole-3-acetic acid, benzimidazole-2-acetic acid, benzimidazole-2-propionicacid, 2-methylbenzimidazole-5-acetic acid, 2-methylbenzimidazole-6-acetic acid, 1H-benzotriazole-1-acetic acid, 1H-benzotriazole-1-n-butyric acid, 4-nitro-1H-benzotriazole-1-acetic acid, 2H-benzotriazole-2-acetic acid, quinoline-2-carboxylic acid, 2-(4-chlorophenyl) quinoline-4-carboxylic acid, 1,2-dihydro-1-oxoisoquinoline-3-carboxylic acid, 1,2-dihydro-1-oxoisoquinoline-3-acetic acid, quinoxaline-6-carboxylic acid, quinoxaline-6-acetic acid, 2,3-dimethoxyquinoxaline-6-acetic acid, 2,3-dichloroquinoxaline-6-carboxylic acid and so forth.

7-aminocephalosporanic acid (7-amino-3-acetoxymethyl-3-cephem-4-carboxylic acid) which is one of the starting materials of Formula II is a known compound and can be obtained by the hydrolysis of the antibiotic Cephalosporin C [Biochemical Journal 79, 408–416 (1961)].

When using a condensed N-containing heterocyclic carboxylic acid, the reaction is preferably carried out in the presence of a condensing agent such as dicyclohexylcarbodiimide, N-cyclohexyl-N'-morpholinoethylcarbodiimide, pentamethylene-ketene-N-cyclohexylimine, N-ethyl-o-phenyl-isoxazolium-3'-sulphonate, phosphorus trichloride, etc. Under such circumstances, it is believed that the reaction may mainly proceed through an active form of the carboxyl radical in the condensed N-containing heterocyclic acid or of the amino radical in the 7-aminocephalosporanic acid.

Examples of the reactive derivatives of the condensed N-containing heterocyclic carboxylic acid to be frequently used are the acid halide, acid azide, mixed acid anhydride with alkylphosphoric acid or alkylcarbonic acid, acid amide with imidazole or 4-substituted imidazole, acid cyanomethyl ester, acid p-nitrophenyl ester and so forth. These reactive derivatives are suitably selected in accordance with the kinds of condensed N-containing heterocyclic carboxylic acid to be used.

The reaction is usually carried out in the presence of a solvent. As a suitable solvent may be mentioned acetone, dioxane, acetonitrile, chloroform, ethylene chloride, tetrahydrofuran, or other organic solvents which are inert in the reaction and are used commonly. Of these solvents, the hydrophylic ones may be used with water.

Also, the reaction may be carried out in the presence of a base such as an alkali metal hydrogen carbonate, trialkylamine, pyridine, etc. The reaction is carried out in most cases under cooling or at room temperature though the temperature is not particularly limited.

After completion of the reaction, the reaction product is separated according to conventional methods known in the art.

When using the compound of Formula II wherein M is a pharmaceutically acceptable non-toxic cation as a starting compound, the object compound of Formula I wherein M is hydrogen is mainly obtained, because dissociation of the cation tends to occur during the separation of the reaction product. Therefore, if it is desired to obtain the object compound of Formula I wherein M is a pharmaceutically acceptable non-toxic cation, the compound of Formula I wherein M is hydrogen is treated with an appropriate compound such as sodium hydroxide, potassium hydroxide, sodium α-ethylhexanoate, triethylamine, dicyclohexylamine, diphenylenediamine or dibenzylethylenediamine.

In addition, the compound of Formula I wherein $R_2$ is pyridinium, azido or guanidinium may be obtained by reacting the compound of Formula I wherein $R_2$ is acetoxy, with pyridine, sodium azide or guanidine.

Both 7-aminocephalosporanic acid or a derivative thereof of Formula II to be used in the reaction of this invention and the product compound of Formula I are comparatively unstable and tend to decompose during the reaction. Therefore, it is preferable to carry out the reaction and separation under mild conditions.

The resulting compound of Formula I not only demonstrates resistance to penicillinase and an acid, but exhibits advantageous physiological properties and activity against a wide variety of micro-organisms. Also the compound of Formula I shows high blood levels after oral administration to mice.

The following examples will illustrate the compounds available in accordance with this invention.

In the examples, "MIC" means a minimum inhibitory concentration which is measured by the serial dilution method commonly employed in bioassay of antimicrobial compounds, and *Escherichia coli* and *Staphylococcus aureus* are referred to as "E. coli" and "St. aureus," respectively.

*Example 1*

(i) 7-(indole-3-methylthioacetamido) cephalosporanic acid:

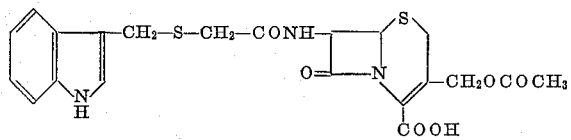

Dicyclohexylcarbodiimide (6.4 g.) in 20 cc. of tetrahydrofuran was added dropwise to 7.072 g. of indole-3-(methylthioacetic acid) in 140 cc. of tetrahydrofuran, and stirred for 30 minutes at room temperature. To this solution were added dropwise 8.704 g. of 7-aminocephalosporanic acid and 2.688 g. of sodium hydrogen carbonate in 160 cc. of water within 5 minutes, and after standing overnight stirred for 2 hours at room temperature and then for a day. The reaction mixture was then filtered and the filtrate was distilled to remove tetrahydrofuran. The remainder was further filtered, and the resulting filtrate was extracted with ethyl acetate after adjusting the pH to 1.0. The extract was distilled to remove the solvent and the remainder was dissolved in 30 cc. of acetone. This acetone solution was filtered, and acetone was distilled off. Thus obtained remainder was washed with ether to obtain 5.607 g. of 7-[indole-3-(methylthioacetamido)] cephalosporanic acid as faint yellow powders.

MIC: E. coli>40 γ/cc., St. aureus 1 γ/cc.

Effectiveness of the substance above obtained in doses of 6 mg. against *Diplococcus penumoniae* III infection in mice and *Streptococcus hemolyticus* S–23 infection in mice, was 1.33 times and 1.25 times as potent as that of 6 - (5 - methyl - 3 - phenylisoxazole - 4 - carbonamido) penicillanic acid in same doses, correspondingly.

(ii) Dicyclohexylamine salt of 7-(indole-3-methylthioacetamido) cephalosporanic acid:

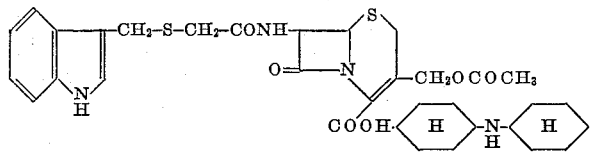

This substance (4.1 g.) obtained in (i) was dissolved in 25 cc. of acetone. To this acetone solution was added 1.8 g. of dicyclohexylamine in 5 cc. of acetone, and allowed to stand a few minutes to obtain crystal-like faint yellow powders. These powders were recrystallized from ethanol to obtain 865 mg. of dicyclohexylamine salt of 7-(indole-3-methylthioacetamido) cephalosporanic acid as needles having M.P. 162–163° C. (dec.).

*Analysis.*—Calculated from

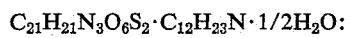

C,59.52; H, 6.81; N, 8.42. Found: C, 59.28; H, 6.77; N, 8.44.

UV: $\lambda_{max.}^{95\% \ C_2H_5OH}$ 222 mμ, E 585; 272 mμ, E 171.

MIC: E. coli>40 γ/cc., St. aureus 0.25 γ/cc.

*Example 2*

(i) 7-(1H-benzotriazole-1-acetamido) cephalosporanic acid:

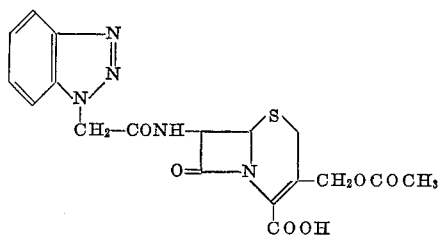

1H-benzotriazole-1-acetic acid (354 mg.) in 2 cc. of tetrahydrofuran solution containing dicyclohexylcarbodiimide (211 mg./cc.) was treated with 540 mg. of 7-aminocephalosporanic acid and 180 mg. of sodium hydrogen carbonate in 8 cc. of tetrahydrofuran in the same way as described in (i) of Example 1 to obtain 395 mg. of 7-(1H-benzotriazole - 1-acetamido) cephalosporanic acid as powders.

(ii) Dicyclohexylamine salt of 7-(1H-benzotriazole-1-acetamido) cephalosporanic acid:

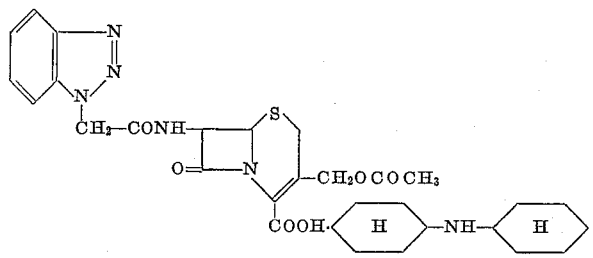

The substance (395 mg.) obtained in (i) in 20 cc. of aqueous acetone and 200 mg. of dicyclohexylamine were treated in the same way as described in (ii) of Example 1 to obtain 212 mg. of dicyclohexylamine salt of 7-(1H-benzotriazole-1-acetamido) cephalosporanic acid as colorless needles having M.P. 205–206° C. (dec.).

UV: $\lambda_{max.}^{95\% \ C_2H_5OH}$ 260 mμ, E 241.

MIC: E. coli 20 γ/cc., St. aureus 0.5 γ/cc.

*Example 3*

(i) 7-(5 - methyl-1H-benzotriazole-1-acetamido) cephalosporanic acid:

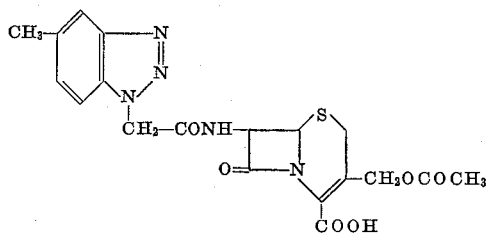

5-methyl-1H-benzotriazole - 1-acetic acid (382 mg.) dissolved in 2 cc. of tetrahydrofuran solution containing dicyclohexylcarbodiimide (215 mg./cc.) was treated with 540 mg. of 7-aminocephalosporanic acid and 180 mg. of sodium hydrogen carbonate in 10 cc. of tetrahydrofuran and 10 cc. of water in the same way as described in (i) of Example 1 to obtain 145 mg. of 7-(5-methyl-1H-benzotriazole-1-acetamido) cephalosporanic acid.

(ii) Dicyclohexylamine salt of 7-(5-methyl-1H-benzotriazole-1-acetamido) cephalosporanic acid:

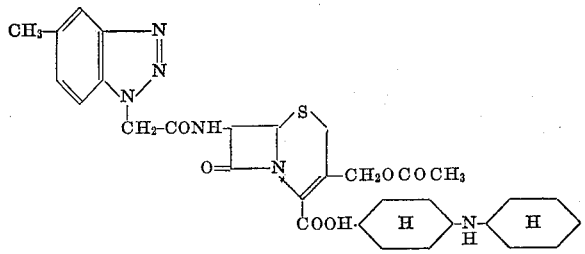

The substance (145 mg.) obtained in (i) and 72 mg. of dicyclohexylamine were treated in the same way as described in (ii) of Example 2 to obtain 147 mg. of dicyclohexylamine salt of 7-(5-methyl-1H-benzotriazole-1-acetamido) cephalosporanic acid as powders having M.P. 172–173° C. (dec.).

UV: $\lambda_{max.}^{95\% \ C_2H_5OH}$ 265 m$\mu$, E 195.

MIC: E. coli 40 $\gamma$/cc., St. aureus 1 $\gamma$/cc.

*Example 4*

(i) 7-(7-nitro-1H-benzotriazole-1-acetamido) cephalosporanic acid:

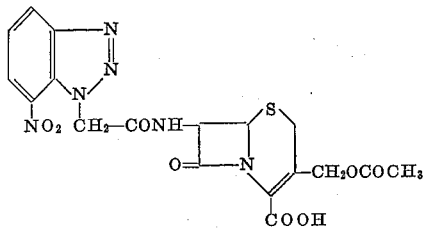

7-nitro-1H-benzotriazole-1-acetic acid (400 mg.) dissolved in 2 cc. of tetrahydrofuran solution containing dicyclohexylcarbodiimide (215 mg./cc.) was treated with 500 mg. of 7-aminocephalosporanic acid and 170 mg. of sodium hydrogen carbonate in 10 cc. of tetrahydrofuran and 10 cc. of water, in the same way as described in (i) of Example 1 to obtain 157 mg. of 7-(7-nitro-1H-benzotriazole-1-acetamido) cephalosporanic acid as powders.

(ii) Dicyclohexylamine salt of 7-(7-nitro-1H-benzotriazole-1-acetamido) cephalosporanic acid:

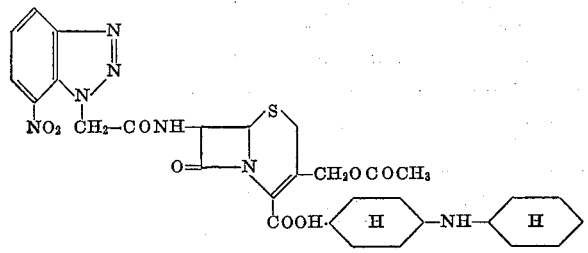

The substance (157 mg.) obtained in (i) and 62 mg. of dicyclohexylamine were treated in the same way as described in (ii) of Example 1 to obtain 35 mg. of dicyclohexylamine salt 7-(7-nitro-1H-benzotriazole-1-acetamido) cephalosporanic acid as powders having M.P. 186–187° C. (dec.).

UV: $\lambda_{max.}^{95\% \ C_2H_5OH}$ 304 m$\mu$, E 148.

MIC: E. coli >40 $\gamma$/cc., St. aureus 0.25 $\gamma$/cc.

*Example 5*

(i) 7-(2H-benzotriazole-2-acetamido) cephalosporanic acid:

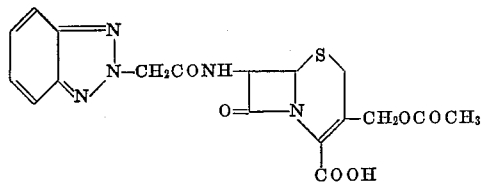

2H-benzotriazole-2-acetic acid (443 mg.) in 2.5 cc. of tetrahydrofuran solution containing dicyclohexylcarbodiimide (211 mg./cc.) was treated with 680 mg. of 7-aminocephalosporanic acid and 227 mg. of sodium hydrogen carbonate in 10 cc. of tetrahydrofuran and 10 cc. of water in the same way as described in (i) of Example 1 to obtain 306 mg. of 7-(2H-benzotriazole-2-acetamido) cephalosporanic acid as powders.

(ii) Dicyclohexylamine salt of 7-(2H-benzotriazole-2-acetamido) cephalosporanic acid:

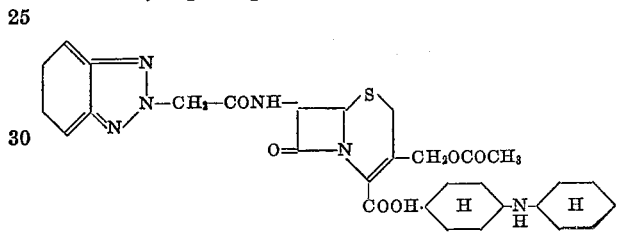

The substance (306 mg.) obtained in (i) and 163 mg. of dicyclohexylamine in 5 cc. of aqueous acetone were treated in the same way as described in (ii) of Example 1 to obtain 236 mg. of dicyclohexylamine salt of 7-(2H-benzotriazole-2-acetamido) cephalosporanic acid as colorless needles having M.P. 197–199° C. (dec.).

UV: $\lambda_{max.}^{95\% C_2H_5OH}$ 273 m$\mu$, E290. $\lambda_{inf.}^{95\% C_2H_5OH}$ 267.2m$\mu$, E 265; 279.5 m$\mu$, E 274; 286 m$\mu$, E 206

MIC: E. coli 20 $\gamma$/cc., St. aureus 0.5 $\gamma$/cc.

Analysis.—Calculated for $C_{30}H_{40}N_6O_6S$: C, 58.76; H, 6.58; N, 13.71. Found: C, 59.06; H, 6.86; N, 13.59.

*Example 6*

(i) 7-(5-chloro - 1H - benzotriazole-1-acetamido) cephalosporanic acid:

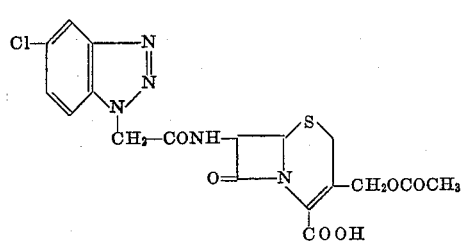

5-chloro-1H-benzotriazole-1-acetic acid (423 mg.) in 2 cc. of tetrahydrofuran solution containing dicyclohexylcarbodiimide (215 mg./cc.) was treated with 540 mg. of 7-aminocephalosporanic acid and 180 mg. of sodium hydrogen carbonate in 10 cc. of tetrahydrofuran and 10 cc. of water in the same way as described in (i) of Example 1 to obtain 286 mg. of 7-(5-chloro-1H-benzotriazole-1-acetamido) cephalosporanic acid.

(ii) Dicyclohexylamine salt of 7-(5-chloro-1H-benzotriazole-1-acetamido) cephalosporanic acid:

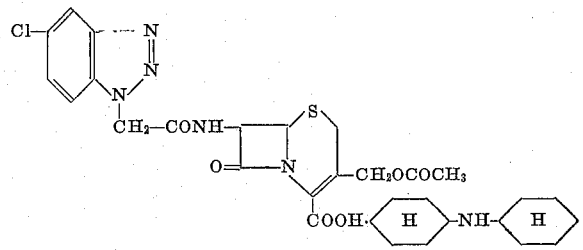

The substance (286 mg.) obtained in (i) and 120 mg. of dicyclohexylamine were treated in the same way as described in (ii) of Example 1 to obtain 106 mg. of dicyclohexylamine salt of 7-(5-chloro-1H-benzotriazole-1-acetamido) cephalosporanic acid having M.P. 172–173° C. (dec.).

UV: $\lambda_{max.}^{95\% \ C_2H_5OH}$ 265 m$\mu$, E 206.6

MIC: E. coli 40 $\gamma$/cc., St. aureus 0.25 $\gamma$/cc.

*Example 7*

(i) 7-(4-nitro - 1H - benzotriazole-1-acetamido) cephalosporanic acid:

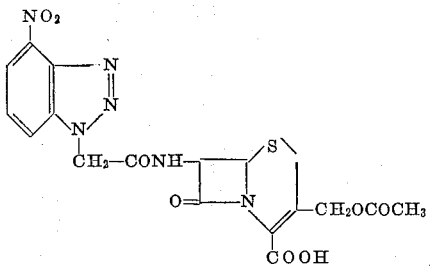

4-nitro-1H-benzotriazole-1-acetic acid (444 mg.) in 0.2 cc. of tetrahydrofuran solution containing dicyclohexylcarbodiimide (215 mg./cc.) was treated with 540 mg. of 7-aminocephalosporanic acid and 180 mg. of sodium hydrogen carbonate in 10 cc. of tetrahydrofuran and 10 cc. of water, in the same way as described in (i) of Example 1 to obtain 214 mg. of 7-(4-nitro-1H-benzotriazole-1-acetamido) cephalosporanic acid.

(ii) Dicyclohexylamine salt of 7-(4-nitro-1H-benzotriazole-1-acetamido) cephalosporanic acid:

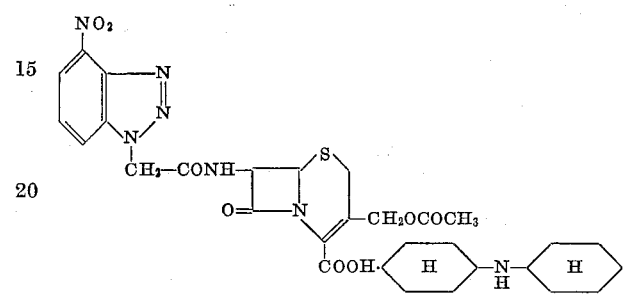

The substance (214 mg.) obtained in (i) and 90 mg. of dicyclohexylamine were treated in the same way as described in (ii) of Example 1 to obtain 74 mg. of dicyclohexylamine salt of 7-(4-nitro-1H-benzotriazole-1-acetamido) cephalosporanic acid having M.P. 181–183° C. (dec.).

UV: $\lambda_{max.}^{95\% \ C_2H_5OH}$ 310 m$\mu$, E 143.4

MIC: E. coli 40 $\gamma$/cc., St. aureus 0.5 $\gamma$/cc.

*Analysis.*—Calculated for $C_{30}H_{38}O_6N_6S$: C, 59.00; H, 6.27; N, 13.76. Found: C, 58.83; H, 6.30; N, 13.52.

The following compounds were prepared by the same way as described in (i) of Example 1.

TABLE 1

| Compound | Form | M.P. (°C.) (dec.) | UV | | | MIC ($\gamma$/cc.) | |
|---|---|---|---|---|---|---|---|
| | | | Solvent | $\lambda$ (m$\mu$) | 1% E 1 cm. | E. coli | St. aureus |
| 7-(Indole-3-acetamido) cephalosporanic acid | Fine prisms. | >240 | | | | >40 | 0.5 |
| 7-(2-methylindole-3-actamido) cephalosporanic acid | Powders | 76–82 | 80% $C_2H_5OH$ NaOH | (max.) 271 | 259 | >40 | 0.25 |
| 7-(2-methylindole-3-methylthioacetamido) cephalosporanic acid. | Powders | 95–105 | 80% $C_2H_5OH$ NaOH | (max.) 272 | 234 | >40 | 0.25 |
| 7-(1H-indazole-3-acetamido) cephalosporanic acid | Powders | 110–135 | Tetrahydrofuran | (max.) 265 289.5 301 | 205 170 110 | 40 | 0.4 |
| 7-[1H-benzotriazole-1-(3-n-butanamido)] cephalosporanic acid | | 81–86 | 80% $C_2H_5OH$ NaOH | (max.) 258.5 | 349 | >40 | 2.5 |
| 7-(2,3-dimethoxyquinoxaline-6-acetamido) cephalosporanic acid | Powders | 161–165 | 80% $C_2H_5OH$ NaOH | (max.) 247 313 327 | 450 210 206 | >40 | 1 |
| 7-(2,3-dichloroquinoxaline-6-acetamido) cephalosporanic acid | Powders | 169–170 | Tetrahydrofuran | (max.) 248 251 327 344 | 726 749 167 115 | >40 | 0.2 |
| 7-(1,2-dihydro-1-oxoisoquinoline-3-carbonamido) cephalosporanic acid. | Powders | 120–130 | 80% $C_2H_5OH$ NaOH | (inf.) 241 252 (max.) 327 | 298 283.6 206 | >40 | 8 |

Example 8

7-[2-(4-chlorophenyl) quinoline-4-carbonamido] cephalosporanic acid:

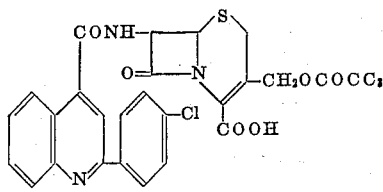

7-aminocephalosporanic acid (540 mg.) was dissolved in 0.5 cc. of triethylamine and 20 cc. of chloroform. To this solution was added 2-(4-chlorophenyl) quinoline-4-carbonyl chloride prepared from 567 mg. of 2-(4-chlorophenyl) quinoline-4-carboxylic acid and thionyl chloride, and stirred for an hour under cooling and then for an hour at room temperature. After allowing to stand overnight, the reaction mixture was adjusted to pH 3.0 with hydrochloric acid, and chloroform layer was condensed. The remainder was dissolved in acetone, and to this acetone solution was added ether. The resulting precipitate was collected by filtration and washed with petroleum ether to obtain 177 mg. of 7-[2-(4-chlorophenyl) quinoline-4-carbonamido] cephalosporanic acid as powders having M.P. 105–112° C. (dec.).

UV: $\lambda_{max.}^{80\% \ C_2H_5OH\cdot NaOH}$ 265 m$\mu$, E 371.7

MIC: $E.\ coli$ >40 $\gamma$/cc., $St.\ aureus$ >40 $\gamma$/cc.

The following compounds were prepared by the same way as described above.

The substance (500 mg.) obtained in (i) of Example 1 was dissolved in 6 cc. of water and 4 cc. of pyridine, and allowed to stand for 45 hours at 40° C. The reaction mixture was condensed under reduced pressure, and the residue was dried and washed with acetone to obtain 240 mg. of powders. These powders were extracted with 20 cc. of water and condensed under reduced pressure. The residue was washed with acetone to obtain 7-[indole-3-(methylthioacetamido)] - 3 - pyridiniummethyl - decephalosporanic acid inner salt as faint yellow powders having M.P. 120–130° C. (dec.).

UV: $\lambda_{max.}^{H_2O}$ 269 m$\mu$, E 172

MIC: $E.\ coli$ >40 $\gamma$/cc., $St.\ aureus$ 2.5 $\gamma$/cc.

The following compound was prepared by the same way as described above.

TABLE 3

| Compound | Form | m.p. (° C.) (dec.) | UV | | | MIC ($\gamma$/cc.) | |
|---|---|---|---|---|---|---|---|
| | | | Solvent | $\lambda$ (m$\mu$) | 1% E 1 cm. | E. coli | St. aureus |
| 7-(1H-benzotriazole-1-acetamido)-3-pyridinium-methyl-decephalosporanic acid inner salt. | Yellow Powders | 161-165 | H$_2$O | 258 | 277.4 | | |

Example 10

Sodium salt of 7-[indole-3-(methylthioacetamido)]-cephalosporanic acid:

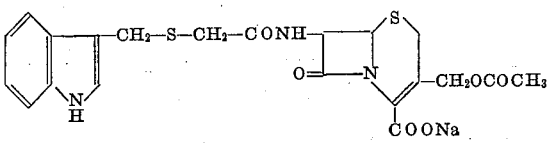

The substance (200 mg.) obtained in (i) of Example 1 was dissolved in 5 cc. of acetone. To this acetone solution was added 70 mg. of sodium $\alpha$-ethyl hexenoate in 1 cc. of acetone and allowed to stand overnight in an ice-

TABLE 2

| Compound | Form | M.P. (° C.) (dec.) | UV | | | MIC ($\gamma$/cc.) | |
|---|---|---|---|---|---|---|---|
| | | | Solvent | $\lambda$ (m$\mu$) | 1% E 1 cm. | E. coli | St. aureus |
| 7-(1H-Indazole-3-carbonamido) cephalosporanic acid | Powders | 135-137 | Tetrahydrofuran | (max.) 270 295 | 233 227 | >40 | 10 |
| 7-(2,3-dichloroquinoxaline-6-carbonamido) cephalosporanic acid | Powders | 180-190 | 80% C$_2$H$_5$OH NaOH | (max.) 254 330 346 | 43 14 15 | >40 | >40 |
| 7-(Quinoline-2-carbonamido) cephalosporanic acid | Powders | 92-102 | 80% C$_2$H$_5$OH NaOH | (max.) 239 | 1,070 | >40 | 10 |

Example 9

7-[indole-3-(methylthioacetamido)] - 3 - pyridinium-methyl-decephalosporanic acid inner salt:

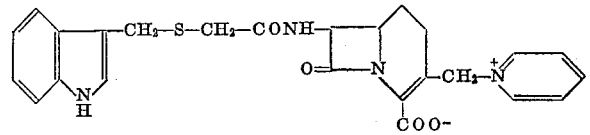

box to obtain 2 g. of sodium salt of 7-[indole-3-(methylthioacetamido)] cephalosporanic acid as colourless crystals having M.P. 165–167° C. (dec.)

UV: $\lambda_{max.}^{H_2O}$ 260 m$\mu$, E 137

The following compound was prepare by the same way as described above.

TABLE 4

| Compound | Form | m.p. (°C.) (dec.) | UV Solvent | (mμ) | 1% E 1 cm. |
|---|---|---|---|---|---|
| Sodium salt of 7-(1H-benzotriazole-1-acetamido) cephalosporanic acid | | 212–214 | 95% C₂H₅OH | (max.) 259 | 325.1 |

Example 11

7-(indole - 3 - methylthioacetamido) - 3 - azidomethyl-decephalosporanic acid:

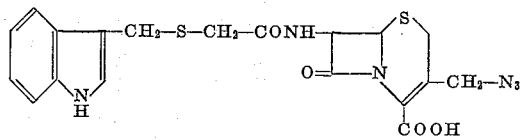

The substance (120 mg.) obtained in (i) of Example 1 and 40 mg. of sodium azide were dissolved in 2 cc. of water and 2 cc. of acetone. After allowing to stand at 37° C. for 48 hours, this solution was acidified with dil. Sulfuric acid and extracted with 4 cc. of ethyl acetate twice. The extract solution was condensed under reduced pressure, and the remainder was passed through a column filled with silica gel and eluted with chloroform. The elute was condensed under reduced pressure to obtain 34 mg. of 7-(indole-3-methylthioacetamido)-3-azidomethyl-decephalosporanic acid having M.P. 92–98° C. (dec.).

MIC: *E. coli* >40 γ/cc., *St. aureus* 0.25 γ/cc., St. No. 11 (penicillin resistant strain) 0.25 γ/cc.

Example 12

7 - (indole - 3 - methylthioacetamido) - 3-guanidinium-methylcephalosporanic acid inner salt:

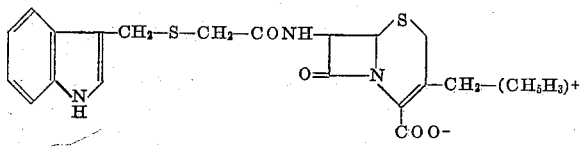

The substance (110 mg.) obtained in (i) of Example 1 and 80 mg. of quanidine nitrate were dissolved in 5 cc. of water. This solution was allowed to stand at 37° C. for 24 hours. The resulting precipitate was recrystallized from alcohol and water to obtain 26 mg. of 7-(indole-3-methylthioacetamido) - 3 - quanidiniummethyl-decephalosporanic acid inner salt having M.P. 157–165° C. (dec.).

MIC: *E. coli* >40 γ/cc., *St. aureus* 20 γ/cc., St. No. 11 (penicillin resistant strain) 0.25 γ/cc.

We claim:
1. A compound having the general formula:

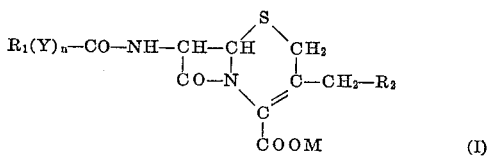

wherein $R_1$ is an indazole, benzotriazole, quinoxaline group or a substituted indazole, substituted benzotriazole or substituted quinoxaline group in which the substituent is halogen, nitro or lower alkyl; $R_2$ is an acetoxy, pyridinium, azido or guanidinium group; $n$ is an integer from 0 to 1; Y is a lower alkylene group; and M is hydrogen, an alkali metal, a cyclohexylammonium group or an anionic charge.

2. 7-(1H-indazole-3-acetamido) cephalosporanic acid.
3. 7-(5-methyl-1H-benzotriazole-1-acetamido) cephalosporanic acid or the dicyclohexylamine salt thereof.
4. 7-(5-chloro-1H-benzotriazole-1-acetamido) cephalosporanic acid or the dicyclohexylamine salt thereof.
5. 7-(2,3-dichloroquinoxaline or 2,3,-dimethoxyquinoxaline-6-carbonamido) cephalosporanic acid.
6. 7-(1H or 2H-benzotriazole-1 or 2-acetamido)-cephalosporanic acid or the dicyclohexylamine salt thereof.
7. 7-(4 or 7 - nitro - 1H-benzotriazole-1-acetamido)-cephalosporanic acid or the dicyclohexylamine salt thereof.

References Cited
UNITED STATES PATENTS 3,131,184  4/1964  Chow et al. _____ 260—243
3,261,832  7/1966  Cowley et al _____ 260—243

NICHOLAS S. RIZZO, *Primary Examiner.*

UNITED STATES PATENT OFFICE
CERTIFICATE OF CORRECTION

Patent No. 3,360,515                          December 26, 1967

Tadayoshi Takano et al.

It is hereby certified that error appears in the above numbered patent requiring correction and that the said Letters Patent should read as corrected below.

Column 1, lines 20 to 25, for that portion of the formula reading "-NCH-" read -- -CH- --; columns 7 and 8, TABLE 1, eighth column, line 2 thereof, for "0.25" read -- 1 --; column 9, lines 5 to 12, for that portion of the formula reading "-CH$_2$OCOCC$_3$" read -- -CH$_2$OCOCH$_3$ --; column 11, line 47, for "quanidine" read -- guanidine --; line 51, for "-3-quanidiniummethyl-" read -- -3-guanidiniummethyl- --.

Signed and sealed this 25th day of February 1969.

(SEAL)
Attest:

Edward M. Fletcher, Jr.                          EDWARD J. BRENNER

Attesting Officer                                    Commissioner of Patents